United States Patent
Sukirya

(10) Patent No.: US 8,156,504 B2
(45) Date of Patent: Apr. 10, 2012

(54) SCALABLE RESOURCES IN A VIRTUALIZED LOAD BALANCER

(75) Inventor: Sukento Sukirya, Sugar Hill, GA (US)

(73) Assignee: Cisco Technology, Inc., San Jose, CA (US)

( * ) Notice: Subject to any disclaimer, the term of this patent is extended or adjusted under 35 U.S.C. 154(b) by 1046 days.

(21) Appl. No.: 11/868,232

(22) Filed: Oct. 5, 2007

(65) Prior Publication Data
US 2009/0094610 A1 Apr. 9, 2009

(51) Int. Cl.
*G06F 9/46* (2006.01)
(52) U.S. Cl. .......................................... 718/105; 718/108
(58) Field of Classification Search .................. None
See application file for complete search history.

(56) References Cited

U.S. PATENT DOCUMENTS

| | | | |
|---|---|---|---|
| 7,213,246 B1 * | 5/2007 | van Rietschote et al. | 718/1 |
| 2004/0268358 A1 * | 12/2004 | Darling et al. | 718/105 |
| 2005/0108712 A1 * | 5/2005 | Goyal | 718/100 |
| 2008/0225888 A1 * | 9/2008 | Valluri et al. | 370/466 |

* cited by examiner

*Primary Examiner* — Emerson Puente
*Assistant Examiner* — Sisley Kim
(74) *Attorney, Agent, or Firm* — Patent Capital Group

(57) ABSTRACT

In one embodiment, a load balancing system may include a first physical device that provides a resource. The first physical device may have a first virtual device running actively thereon. The first virtual device may have the resource allocated to it on the physical device. The first physical device may also have a virtual server load balancer running actively thereon. The server load balancer may be adapted to balance a workload associated with the resource between the first virtual device and a second virtual device. The second virtual device may be running in active mode on a second physical device, and in standby mode on the first physical device. The first virtual device may be in standby mode on the second physical device.

12 Claims, 4 Drawing Sheets

SCALABLE RESOURCES IN A VIRTUALIZED LOAD BALANCER

TECHNICAL FIELD

The present disclosure relates generally to load balancing in computer networks.

BACKGROUND

Load balancing is a technique for spreading work among a number of computers, processes, hard disks, or other resources to improve resource utilization and decrease computing time. Load balancing typically involves dividing an amount of work between two or more computers so that more work gets done in the same amount of time and so that, in general, all users get served faster. Load balancing can be implemented via hardware, software, or a combination of hardware and software.

Often, in active-standby load balancing, the resources in the standby unit tend to be wasted, as the standby unit is usually sitting idle, waiting for a failover to occur. To scale the resources, an additional pair of load balancers may be employed. Such an approach, however, is an inefficient way to scale.

SUMMARY

As described herein, the virtualization and resource allocation capabilities of a load balancer may be employed to enable a resource provided by a single load balancer to be scaled to the equivalent of that resource for more than one load balancer. The virtualization feature enables a physical device to be divided logically to perform as if it were several individual "logical" devices. Each such logical device may be referred to as a "virtual device" or "context." The resource allocation capability enables a load balancer to set aside certain resources for each such context.

A main, or "server," load balancer context may be created to send traffic to each of two processing contexts. Each of the two processing contexts may have a particular resource fully allocated to it. One of the two processing contexts may be configured to be active on a first physical load balancer device, while the other may be configured to be active on a second physical load balancer device. The main load balancer context may be enabled to balance the traffic load between resources provided by each of the two processing contexts. Thus, a user may be provided with the resource equivalent of two load balancers, both operating in active-standby mode, without the need for an additional pair of physical load balancer devices. Such a methodology may be employed to scale and fully utilize any available resource on a load balancer.

DESCRIPTION OF EXAMPLE EMBODIMENTS

Load balancers ("LBs") are well-known, and need not be described in detail herein. The Cisco Application Control Engine ("ACE") is an example of a high-performance, hardware-based server load balancer ("SLB"). It should be understood that such load balancers typically provide virtualization and resource allocation capabilities. The virtualization capability enables a physical device to be divided logically to perform as if it were several individual logical devices. The resource allocation capability enables a load balancer to set aside certain resources for each such logical device.

A typical virtual device application runs in the computer's operating system environment and simulates the operation of one or more entire computers. A typical method for providing the virtual device capability is to use a software package such as VMware, for example, which is a commercial software program used to emulate one or more subordinate computers capable of executing application programs. VMware, for example, runs on a computer system using a so-called native Linux operating system.

The virtual computer environment running within the VMware program can be set up to provide a Windows NT operating system. Then a Microsoft Windows Media Technology server can be executed within the Windows NT operating system. Other programs can also be used to provide the virtual device environment, such as a Java virtual device, for example.

When executed, a virtual device program may create one or more other instances of virtual devices, each having an operating system environment functioning within the native operating system environment of the physical device. Virtual devices may also provide virtual network interfaces in an analogous manner to those provided by single operating system communications devices or computers. Such virtual network interfaces may function by using software procedures, rather than procedures performed in either hardware or in a combination of hardware and software as may be found in single operating system computers. The virtual network interfaces may perform functions that are similar to those performed by single operating system computers, such as, for example, communicating with other computational devices and computers attached to a network, or with other virtual devices. Communication between virtual devices within a physical device is also possible.

Figure 1:
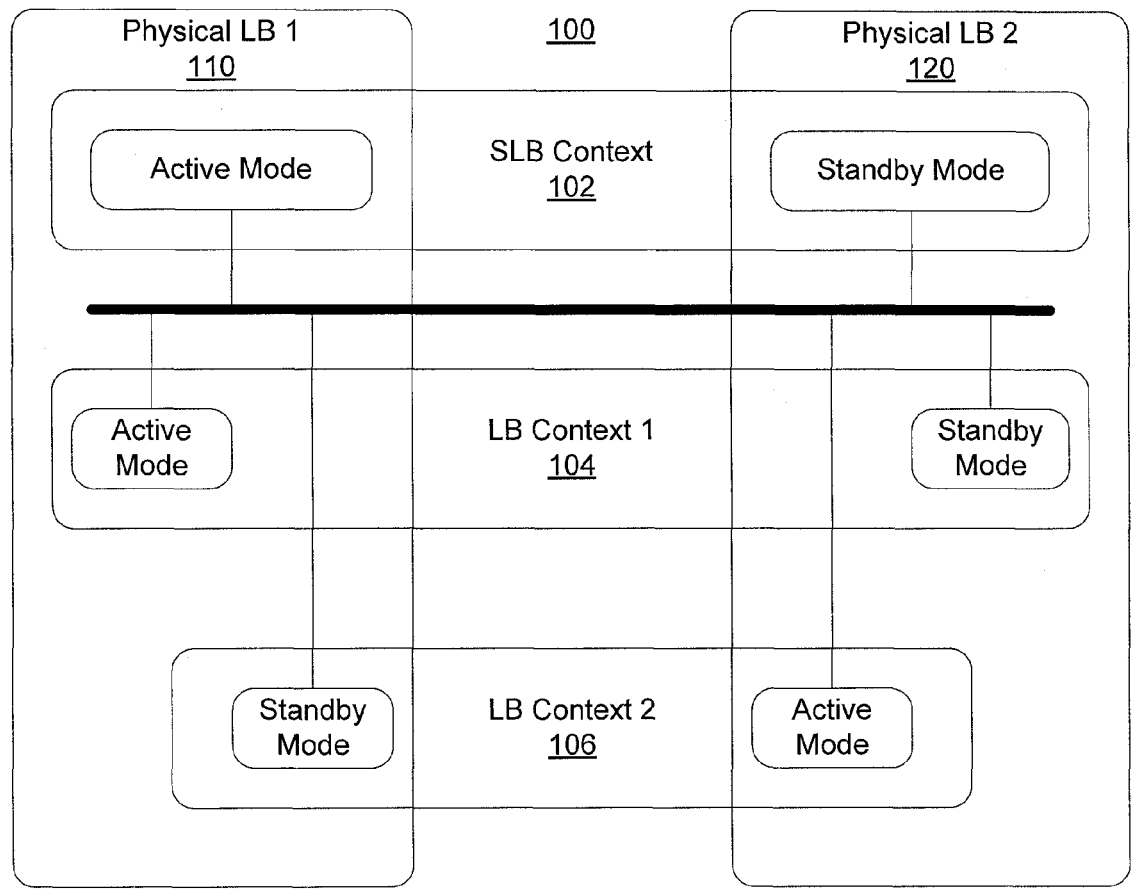
FIG. 1 is a functional block diagram of a system that provides scalable resources in a virtualized load balancer.

FIG. 1 is a functional block diagram of a system 100 for providing scalable resources in a virtualized load balancer. As shown, an SLB context 102 may be configured to load balance traffic between two LB processing contexts 104 and 106. The first LB processing context 104 may be configured to run in active mode on a first physical device 110, which may be a first physical load balancer device, and to run in standby mode on a second physical device 120, which may be a second physical load balancer device. The second LB processing context 106 may be configured to run in active mode on the second physical device 120, and in standby mode on the first physical device 110.

As shown in FIG. 1, the SLB context 102 may be configured to run in active mode on the first physical device 110 and in standby mode on the second physical device 120. It should be understood that the SLB context 102 may be configured to run in active mode on the second physical device 120 and in standby mode on the first physical device 110. The SLB context 102 may be configured to run actively on a third physical device (not shown), in which case it may be configured to run in standby mode on either the first physical device 110, the second physical device 120, or a fourth physical device (not shown).

The SLB context 102 may be in communication with both of the LB processing contexts 104, 106 in both active and standby modes via a network 105, which may be a local area network (LAN). The SLB context 102 may be configured to send traffic, which may include any sort of network traffic, to both LB processing contexts 104, 106. Thus, the SLB context 102 may be enabled to distribute a load across the two processing contexts 104, 106.

Each of the processing contexts 104, 106 may have one or more resources fully allocated to it. Examples of such resources include, without limitation, secure socket layer ("SSL") resources, session-persistent (a.k.a., "sticky") resources, address translation resources, etc. With the first processing context 104 running in active mode on the first physical load balancer device 110, and the second processing context 106 running in active mode on the second physical load balancer device 120, each LB context 104, 106 may have allocated to it up to 100% of the resources provided by the physical load balancer device 110, 120 on which the context 104, 106 is active.

If the load balancer were merely running in active mode on one of the physical devices and in standby mode on the other physical device, then only the resources provided by one of the physical devices (i.e., the one running in active mode) would be available to the load balancer at any given time. Stated conversely, the total resources provided by both of the physical devices would not be available to the load balancer at the same time.

In a system as described herein, the second physical device, rather than sitting idle, may be employed to provide resources that can be allocated to work off the load. That is, because the SLB context 102 can concurrently allocate to both of the processing contexts 104, 106 workload requiring a certain resource, and because each of the processing contexts 104, 106 may have that resource fully allocated to it, the system 100 may provide a user with the resource equivalent of two physical load balancers.

Several example embodiments of systems that provide scalable resources in a virtualized load balancer will now be described. Such embodiments may include SLBs having SSL termination incorporated in the same module. Such embodiments may be useful in deployments where load balancing and SSL termination are required. The Cisco ACE is an example of an SLB that incorporates SSL termination in the same module.

As described above, the virtualization feature of the load balancer may be exploited to double the resource allocation capability of a pair of load balancers. To scale SSL performance, the SSL termination can be configured in two separate contexts, created in a pair of physical load balancers. By taking advantage of the active-active-per-context feature of the load balancers, each of the SSL contexts can be configured as active in a different LB module. That is, a first of the SSL contexts may be running in active mode in a first of the LBs, while the other SSL context is running in active mode in the second LB. Such a system may thus provide SSL performance equal to two independent LB modules.

Figure 2:
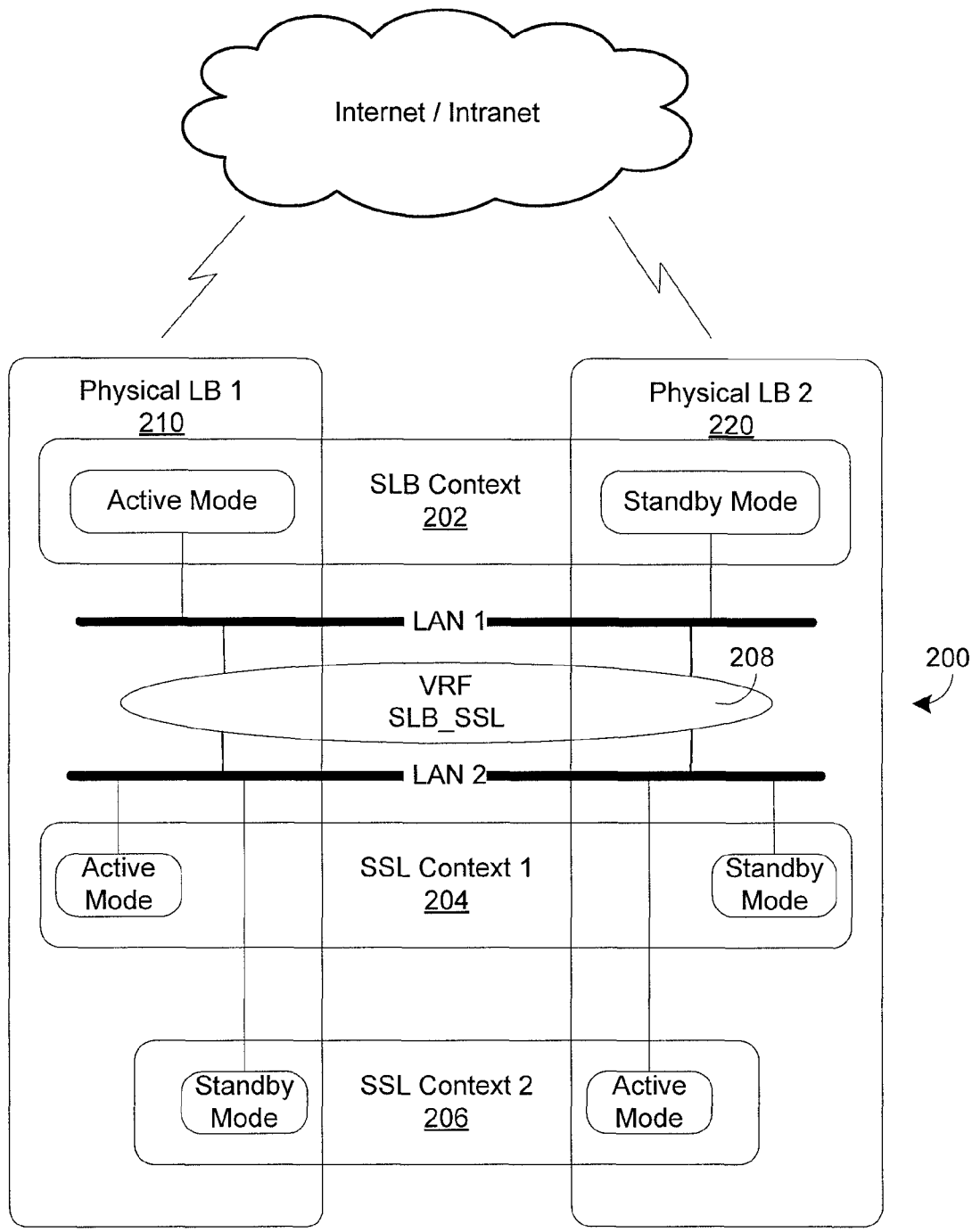
FIG. 2 is a functional block diagram of a multi-context secure sockets layer (SSL) system with source/client network address translation (SNAT) in one-armed mode.
Figure 3:
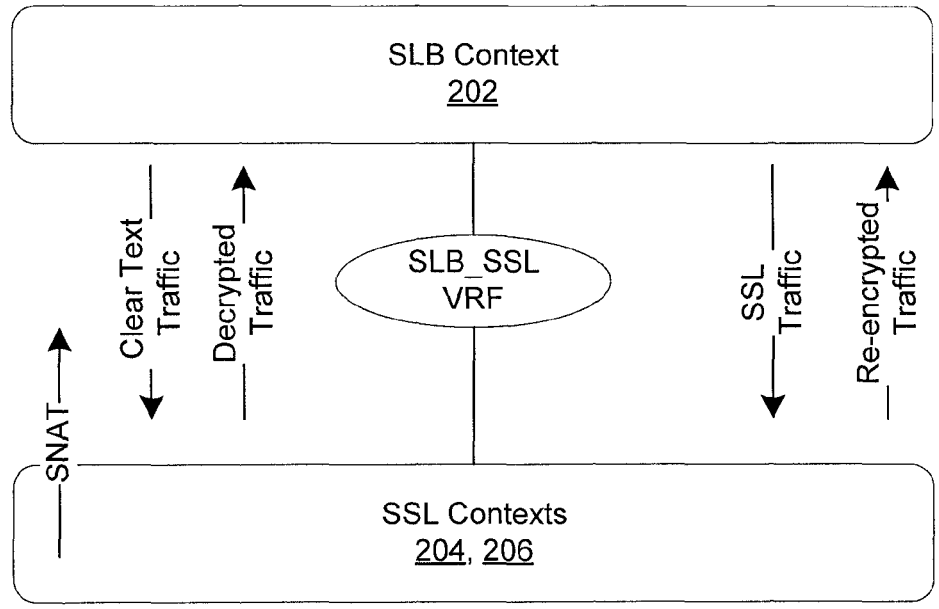
FIG. 3 provides a diagram of traffic flow in an example multi-context SSL system with SNAT in one-armed mode.
Figure 5:
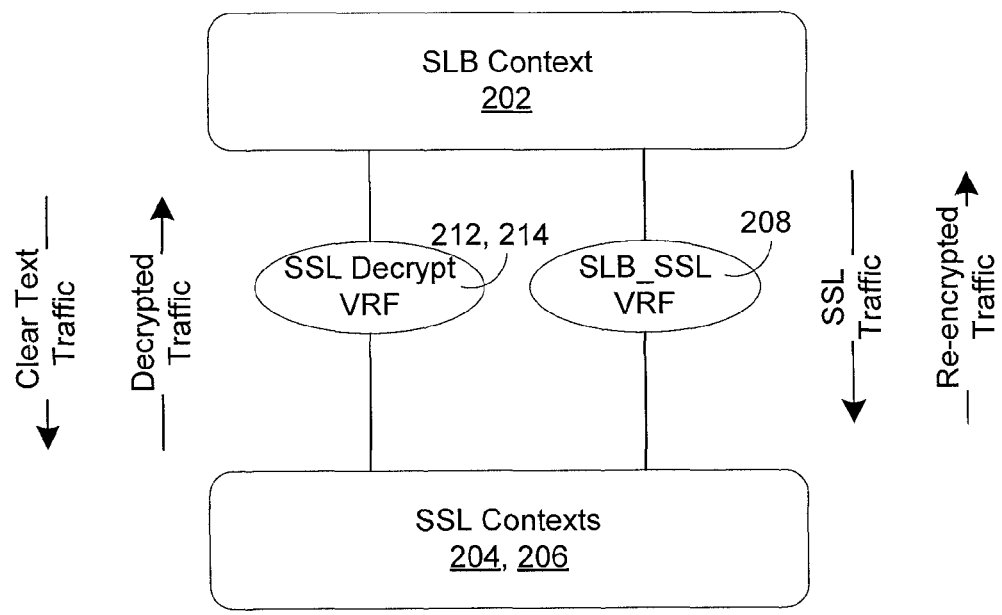
FIG. 5 provides a diagram of traffic flow in an example multi-context SSL system without SNAT in one-armed mode.
Figure 4:
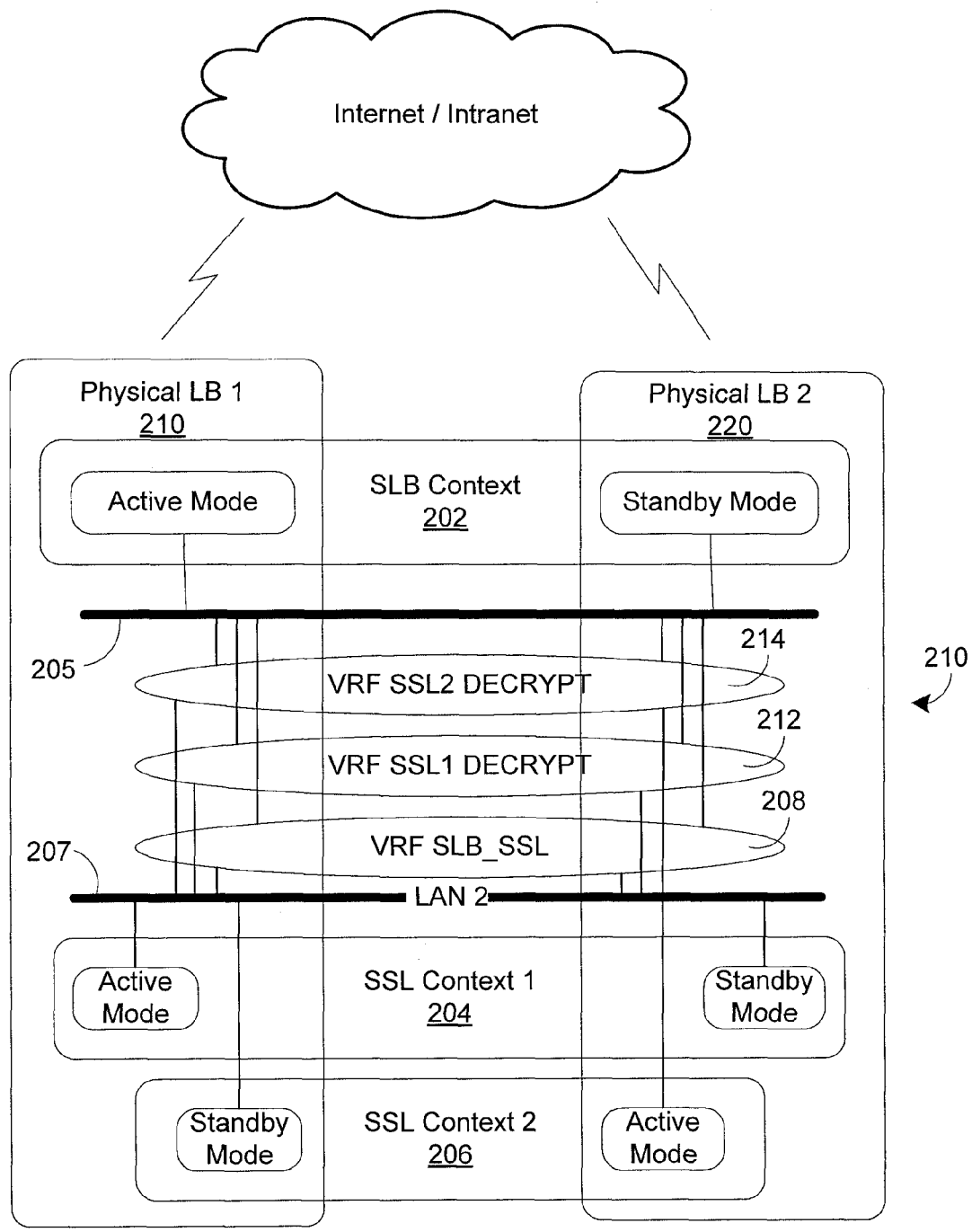
FIG. 4 is a functional block diagram of a multi-context SSL system without SNAT in one-armed mode.

Two approaches for a multi-context SSL solution will now be described. The first, which is described with reference to FIGS. 2 and 3, provides SSL contexts in one-armed mode with source/client network address traffic ("SNAT"). The second, which is described with reference to FIGS. 4 and 5, provides SSL contexts in one-armed mode without SNAT.

In the one-armed with SNAT approach, the decrypted SNAT traffic and SSL traffic use the same virtual routing and forwarding technology ("VRF"), for both incoming traffic and return traffic. VRF is a technology used in computer networks that allows multiple instances of a routing table to co-exist within the same router at the same time. Because the routing instances are independent, the same or overlapping IP addresses can be used without conflicting with each other. VRF may be implemented in a network device by having distinct routing tables, also known as Forwarding Information Bases (FIBs), one per VRF. Alternatively, a network device may have the ability to configure different virtual routers, where each one has its own FIB that is not accessible to any other virtual router instance on the same device.

Such a system may employ the so-called "VRF-Lite." VRF-lite is a smaller-scale implementation of VRF that does not require multi-protocol label switching (MPLS). With VRF-Lite, customer equipment can have multiple VRFs. Thus, VRF-Lite may be used to serve a plurality of customers via only one customer equipment device.

FIG. 2 is a functional block diagram of a multi-context SSL system 200 with SNAT in one-armed mode. As shown, two SSL processing contexts 204, 206 may be created in a pair of physical load balancers 210, 220. A first of the SSL contexts 204 may be running in active mode in a first of the LBs 210, while the other SSL context 206 is running in active mode in the second LB 220. Thus, such a system 200 may provide SSL performance equal to two independent LB modules.

The SLB context 202 may be in communication with both of the SSL processing contexts 204, 206 in both active and standby modes via a network 107, which may be a local area network (LAN), and a VRF 208.

FIG. 3 provides an example diagram of traffic flow in a multi-context SSL system with SNAT in one-armed mode. As shown, clear text traffic may be communicated from the SLB context 202 to the SSL contexts 204, 206. Decrypted traffic may be communicated from the SSL contexts 204, 206 to the SLB context 202.

The SLB context 202 may receive initial SSL traffic from a network-based client (not shown) and forward the SSL traffic to one of the two SSL contexts 204, 206 via the VRF 208. In the SSL contexts 204, 206, the SSL traffic may be terminated and NATed, and then forwarded back to the SLB context 202. SNAT may be used to ensure that return traffic (from one or more real servers (not shown)) is routed back to the SSL contexts 204, 206 for re-encryption. Re-encrypted traffic may be communicated from the SSL contexts 204, 206 to the SLB context 202.

When SNAT is not desirable, an additional VRF may be employed to separate the SSL and decrypted/clear text traffic to ensure proper traffic flow. In these designs, the SSL traffic and decrypted traffic may traverse through the same LB module twice, thus increasing the amount of traffic an LB module has to process. Also, in active-active redundancy with statefull failover setup, the replicated connections may need to take into account in computing total concurrent connections for an LB module.

FIG. 4 is a functional block diagram of a multi-context SSL system without SNAT in one-armed mode. As shown, two SSL contexts 204, 206 may be created in a pair of physical load balancers 210, 220. A first of the SSL contexts 204 may be running in active mode in a first of the LBs 210, while the other SSL context 206 is running in active mode in the second LB 220. Thus, such a system 210 may provide SSL performance equal to two independent LB modules.

The SLB context 202 may be in communication with both of the SSL processing contexts 204, 206 in both active and standby modes via a network 107, which may be a local area network (LAN), and a plurality of VRFs 208, 212, 214.

FIG. 5 provides an example diagram of traffic flow in a multi-context SSL system without SNAT in one-armed mode. The SLB context 202 may receive initial SSL traffic from a network-based client (not shown) and forward the SSL traffic to one of the two SSL contexts 204, 206 via a first VRF 208. In a scenario where SNAT is not desirable (due to business or security requirements, for example), the decrypted traffic can be forwarded to the SLB context 202 for clear text load balancing via a second VRF 212, 214. The additional VRFs 212, 214 may serve as dedicated tunnels for decrypted/clear text traffic between the SLB context 202 and the SSL contexts 204, 206, respectively. Thus, the SSL traffic and the re-encrypted traffic may use a different VRF than the decrypted/clear text traffic.

What is claimed:

1. A system, comprising:
a first physical device that provides a secure sockets layer (SSL) termination resource, the first physical device having a first SSL processing context running actively thereon, the first SSL processing context having the SSL termination resource allocated to it on the first physical device;
a second physical device that also provides the SSL termination resource, the second physical device having a second SSL processing context running actively thereon, the second SSL processing context having the SSL termination resource allocated to it on the second physical device; and
a server load balancer (SLB) context adapted to run in active mode on the first physical device and to run in standby mode on the second physical device to balance a workload associated with the SSL termination resource between the first SSL processing context and the second SSL processing context,
wherein the SLB context concurrently allocates a first portion of the workload to the first SSL processing context and a second portion of the workload to the second SSL processing context that are created between the first physical device and the second physical device, the first SSL context runs in active mode in the first physical device and in standby mode in the second physical device while the second SSL context runs in active mode in the second physical device and in standby mode in the first physical device so that the first and second portions of the workload are processed concurrently at the first SSL processing context and the second SSL processing context respectively.

2. The system of claim 1, wherein the first physical device further provides a second resource and the first SSL processing context also has the second resource allocated to it on the first physical device, the second physical device also provides the second resource and the second SSL processing context has the second resource allocated to it on the second physical device, and the SLB context further balances a workload associated with the second resource between the first SSL processing context and the second SSL processing context.

3. The system of claim 2, wherein the second resource is a session-persistent resource.

4. The system of claim 2, wherein the second resource is an address translation resource.

5. The system of claim 1 wherein the first SSL processing context is adapted to employ the SSL termination resource to work off a portion of the workload allocated to the first SSL processing context by the SLB context.

6. The system of claim 1 wherein the SLB context receives secure sockets layer (SSL) traffic from a network-based client and forwards the SSL traffic to the first and second virtual device load balancer.

7. The system of claim 1 wherein the SLB context receives secure sockets layer (SSL) traffic from a network-based client and forwards the SSL traffic to the first and second SSL processing contexts using virtual routing and forwarding technology (VRF).

8. The system of claim 7, wherein the SSL traffic is terminated in the first SSL processing context and communicated between the SLB context and the first SSL processing context via the VRF.

9. The system of claim 8, wherein source/client network address (SNAT) traffic is communicated between the SLB context and the first SSL processing context via the VRF.

10. The system of claim 8, further comprising a second VRF, wherein decrypted and clear text traffic are communicated between the SLB context and the first SSL processing context via the second VRF.

11. The system of claim 1, wherein the SSL termination resource is adapted to decrypt received traffic.

12. A system, comprising:
a first physical device that provides a secure sockets layer (SSL) termination resource, the first physical device having a first SSL processing context running actively thereon, the first SSL processing context having the SSL termination resource allocated to it on the first physical device,
a second physical device that also provides the SSL termination resource, the second physical device having a second SSL processing context running actively thereon, the second SSL processing context having the SSL termination resource allocated to it on the second physical device; and
wherein the first SSL processing context is adapted to employ the SSL termination resource to work off a portion of a workload allocated to it a server load balancer (SLB) context,
a server load balancer (SLB) context being adapted to run in active mode on the first physical device and to run in standby mode on the second physical device to balance the workload between the first SSL processing context and the second SSL processing context,
wherein the SLB context concurrently allocates a first portion of the workload to the first SSL processing context and a second portion of the workload to the second SSL processing context that are created between the first physical device and the second physical device, the first SSL context runs in active mode in the first physical device and in standby mode in the second physical device while the second SSL context runs in active mode in the second physical device and in standby mode in the first physical device so that the first and second portions of the workload are processed concurrently at the first SSL processing context and the second SSL processing context respectively.

* * * * *